(12) United States Patent
Namgung et al.

(10) Patent No.: US 12,410,310 B2
(45) Date of Patent: Sep. 9, 2025

(54) THERMOPLASTIC RESIN COMPOSITION

(71) Applicant: LG CHEM, LTD., Seoul (KR)

(72) Inventors: Ho Namgung, Daejeon (KR); Do Hyeong Kim, Daejeon (KR); Seong Lyong Kim, Daejeon (KR); Dae San Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1013 days.

(21) Appl. No.: 17/440,656

(22) PCT Filed: Sep. 17, 2020

(86) PCT No.: PCT/KR2020/012578
§ 371 (c)(1),
(2) Date: Sep. 17, 2021

(87) PCT Pub. No.: WO2021/091079
PCT Pub. Date: May 14, 2021

(65) Prior Publication Data
US 2022/0153979 A1 May 19, 2022

(30) Foreign Application Priority Data
Nov. 4, 2019 (KR) .......... 10-2019-0139639

(51) Int. Cl.
*C08L 25/12* (2006.01)
*C08L 25/16* (2006.01)

(52) U.S. Cl.
CPC .......... *C08L 25/12* (2013.01); *C08L 25/16* (2013.01); *C08L 2203/30* (2013.01); *C08L 2205/025* (2013.01); *C08L 2205/035* (2013.01)

(58) Field of Classification Search
CPC .................. C08L 35/06; C08L 25/12
See application file for complete search history.

(56) References Cited

U.S. PATENT DOCUMENTS

| | | | |
|---|---|---|---|
| 10,160,851 B2 | 12/2018 | Jung et al. | |
| 2007/0123648 A1 | 5/2007 | Lee et al. | |
| 2016/0108224 A1* | 4/2016 | Seo | C08F 2/02 526/228 |
| 2017/0292017 A1 | 10/2017 | Jung et al. | |
| 2018/0237630 A1* | 8/2018 | Bae | C08L 77/02 |
| 2019/0177523 A1 | 6/2019 | Jung et al. | |
| 2020/0291213 A1* | 9/2020 | Kang | C08L 25/14 |

FOREIGN PATENT DOCUMENTS

| | | | | |
|---|---|---|---|---|
| CN | 108699317 A | 10/2018 | | |
| EP | 3187539 A1 | 7/2017 | | |
| JP | 2003-041080 A | 2/2003 | | |
| KR | 10-2003-0055445 A | 7/2003 | | |
| KR | 10-0568411 B1 | 4/2006 | | |
| KR | 10-0653503 B1 | 12/2006 | | |
| KR | 2008-0060750 A | 7/2008 | | |
| KR | 10-0887316 B1 | 3/2009 | | |
| KR | 10-2015-0004249 A | 1/2015 | | |
| KR | 20150067745 A | 6/2015 | | |
| KR | 10-2016-0078546 A | 7/2016 | | |
| KR | 10-2018-0059737 A | 6/2018 | | |
| KR | 10-2018-0076698 A | 7/2018 | | |
| KR | 10-2019-0082074 A | 7/2019 | | |
| KR | 20190082148 A | * 7/2019 | ........... | C08L 25/16 |
| KR | 10-2016-0067675 A | 6/2021 | | |
| WO | WO2008026554 A1 | 3/2008 | | |
| WO | WO2018124505 A1 | 7/2018 | | |
| WO | WO-2019182332 A1 | * 9/2019 | ........... | C08L 25/12 |

OTHER PUBLICATIONS

Office Action for European Patent Application No. 20 885 900.9, dated Feb. 21, 2024.
Ulrike Wenzel, "Characterization of an ultra-high molecular weight polymethacrylate with a liquid crystalline side group in dilute solution," Technical University of Berlin, 2000.
Ge Wang et al., "Polymer melting: heating rate effects on DSC melting peaks," Thermochimica Acta, 1994, pp. 203-213, 231.
Extended European Search Report for related Application No. 20885900.9, mailed Apr. 8, 2022.
"Practical Handbook of Plastics Industry, Second Edition, vol. I", Chemical Industry Press, Aug. 31, 2000, p. 180.

* cited by examiner

*Primary Examiner* — Eli D. Strah

(57) ABSTRACT

The present invention provides a thermoplastic resin composition which comprises: a diene-based rubber graft polymer; an alkyl-unsubstituted styrene-based polymer; an alkyl-substituted styrene-based polymer comprising an alkyl-substituted styrene-based monomer unit, an alkyl-unsubstituted styrene-based monomer unit, and a vinyl cyanide-based monomer unit; and a maleimide-based polymer having a weight-average molecular weight of 110,000 to 127,000 g/mol.

8 Claims, No Drawings

THERMOPLASTIC RESIN COMPOSITION

CROSS-REFERENCE TO RELATED APPLICATION

This application is a National Phase of International Application No. PCT/KR2020/012578, which claims priority to and the benefit of Korean Patent Application No. 10-2019-0139639, filed on Nov. 4, 2019, the disclosures of which are incorporated herein by reference in their entirety.

TECHNICAL FIELD

The present invention relates to a thermoplastic resin composition, and specifically, to a thermoplastic resin composition including an alkyl-substituted styrene-based polymer including an alkyl-substituted styrene-based monomer unit, an alkyl-unsubstituted styrene-based monomer unit, and a vinyl cyanide-based monomer unit.

BACKGROUND ART

Diene-based rubber graft polymers are graft polymers formed by graft polymerization of a diene-based rubber polymer with an aromatic vinyl-based monomer and a vinyl cyanide-based monomer. Diene-based rubber graft polymers have excellence in impact resistance, chemical resistance, thermal stability, colorability, fatigue resistance, stiffness, and processability compared to conventional high-impact polystyrene. Due to these features, a thermoplastic resin molded article made of the diene-based rubber graft polymer is used as a part of automotive interior/exterior materials, office supplies, various electrical/electronic products, and the like.

Meanwhile, a diene-based rubber thermoplastic resin composition including the diene-based rubber graft polymer may be used as a material for a rear lamp housing among automotive parts. The rear lamp housing is designed in various shapes depending on the automobile company and becoming thinner. To meet various designs and the thickness trend, there is a demand for improvement in the processability of the diene-based rubber thermoplastic resin composition. In other words, when a melt flow index is low, injection conditions are limited, and thus the design is also limited, and it is not possible to injection-mold the housing with low thickness. To solve the above problem, a diene-based rubber thermoplastic resin composition having a high melt flow index has been developed, but this has a problem in which many heat fusion lines are generated. When many heat fusion lines are generated, the lines are visible on the bonding surface of the rear lamp housing, and thus appearance quality may be degraded. Also, an additional process for removing the lines is required, and thus production efficiency may be degraded. Also, the diffuse reflectance of an aluminum-deposited surface slightly increases.

Accordingly, research on the development of a diene-based rubber thermoplastic resin composition which allows the generation of heat fusion lines to be minimized and also allows the quality of an aluminum-deposited surface to be improved is continuing.

DISCLOSURE

Technical Problem

The present invention is directed to providing a thermoplastic resin composition which allows processability, heat resistance, and characteristics of an aluminum-deposited surface to be improved and also allows the generation of heat fusion lines to be minimized.

Technical Solution

One aspect of the present invention provides a thermoplastic resin composition which comprises: a diene-based rubber graft polymer; an alkyl-unsubstituted styrene-based polymer; an alkyl-substituted styrene-based polymer comprising an alkyl-substituted styrene-based monomer unit, an alkyl-unsubstituted styrene-based monomer unit, and a vinyl cyanide-based monomer unit; and a maleimide-based polymer having a weight-average molecular weight of 110,000 to 127,000 g/mol.

Advantageous Effects

A thermoplastic resin composition of the present invention not only has excellence in processability, heat resistance, and characteristics of an aluminum-deposited surface but also allows the generation of heat fusion lines to be minimized. Also, the thermoplastic resin composition exhibits excellent basic properties such as impact strength, tensile strength, tensile elongation, flexural strength, and the like. Therefore, the thermoplastic resin composition can be used as a material for a rear lamp housing of an automobile, which has various designs and low thickness.

Modes of the Invention

Hereinafter, the present invention will be described in more detail to facilitate understanding of the present invention.

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, a weight-average molecular weight may be measured using polystyrene as a standard substance by gel permeation chromatography.

In the present invention, a glass transition temperature may be measured by differential scanning calorimetry.

In the present invention, an average particle diameter may be measured by a dynamic light scattering method, specifically, by using a Nicomp 380 instrument commercially available from Particle Sizing Systems. In the present invention, the average particle diameter may refer to an arithmetic average particle diameter in the particle size distribution as measured by a dynamic light scattering method, specifically, an average particle diameter in a scattering intensity distribution.

In the present invention, an alkyl-unsubstituted styrene-based monomer may be one or more selected from the group consisting of styrene, 4-fluorostyrene, 4-chlorostyrene, and 4-bromostyrene, with styrene being preferred. A unit derived from the alkyl-unsubstituted styrene-based monomer may be an alkyl-unsubstituted styrene-based monomer unit.

In the present invention, an alkyl-substituted styrene-based monomer may be one or more selected from the group consisting of α-methylstyrene, α-ethylstyrene, and p-methylstyrene, with α-methylstyrene being preferred. A unit derived from the alkyl-substituted styrene-based monomer may be an alkyl-substituted styrene-based monomer unit.

In the present invention, an aromatic vinyl-based monomer may be a monomer encompassing both an alkyl-unsubstituted styrene-based monomer and an alkyl-substituted styrene-based monomer. A unit derived from the aromatic vinyl-based monomer may be an aromatic vinyl-based monomer unit.

In the present invention, a vinyl cyanide-based monomer may be one or more selected from the group consisting of acrylonitrile, methacrylonitrile, phenyl acrylonitrile, and α-chloroacrylonitrile, with acrylonitrile being preferred. A unit derived from the vinyl cyanide-based monomer may be a vinyl cyanide-based monomer unit.

In the present invention, a maleimide-based monomer may be one or more selected from the group consisting of maleimide, N-methyl maleimide, N-ethyl maleimide, N-propyl maleimide, N-isopropyl maleimide, N-butyl maleimide, N-isobutyl maleimide, N-t-butyl maleimide, N-lauryl maleimide, N-cyclohexyl maleimide, N-phenyl maleimide, N-(4-chlorophenyl) maleimide, 2-methyl-N-phenyl maleimide, N-(4-bromophenyl) maleimide, N-(4-nitrophenyl) maleimide, N-(4-hydroxyphenyl) maleimide, N-(4-methoxyphenyl) maleimide, N-(4-carboxyphenyl) maleimide, and N-benzyl maleimide, with N-phenyl maleimide being preferred. A unit derived from the maleimide-based monomer may be a maleimide-based monomer unit.

In the present invention, a maleic acid-based monomer may be one or more selected from the group consisting of maleic anhydride, maleic acid, maleic monoester, and maleic diester, with maleic anhydride being preferred. A unit derived from the maleic acid-based monomer may be a maleic acid-based monomer unit.

1. Thermoplastic Resin Composition

A thermoplastic resin composition according to an embodiment of the present invention includes: 1) a diene-based rubber graft polymer; 2) an alkyl-unsubstituted styrene-based polymer; 3) an alkyl-substituted styrene-based polymer including an alkyl-substituted styrene-based monomer unit, an alkyl-unsubstituted styrene-based monomer unit, and a vinyl cyanide-based monomer unit; and 4) a maleimide-based polymer having a weight-average molecular weight of 110,000 to 127,000 g/mol.

The inventors of the present invention have found that, when a maleimide-based polymer and an alkyl-substituted styrene-based polymer are included together, processability, heat resistance, and characteristics of an aluminum-deposited surface are improved, and the generation of heat fusion lines is minimized, making it more suitable for a rear lamp housing of an automobile. Therefore, the present invention has been completed based the facts.

Hereinafter, the thermoplastic resin composition according to the embodiment of the present invention will be described in detail.

1) Diene-Based Rubber Graft Polymer

A diene-based rubber graft polymer is a graft polymer formed by graft polymerization of a diene-based rubber polymer with an aromatic vinyl-based monomer and a vinyl cyanide-based monomer and may impart excellent impact strength, tensile strength, tensile elongation, flexural strength, and the like to the thermoplastic resin composition. In addition, the diene-based rubber graft polymer may work synergistically with an aromatic vinyl-based polymer, particularly, a second aromatic matrix polymer, to improve the impact strength, tensile strength, and flexural strength of the thermoplastic resin composition.

The diene-based rubber graft polymer may be included at 20 to 35 wt %, and preferably, 23 to 28 wt % in the thermoplastic resin composition. When the above-described condition is satisfied, the diene-based rubber graft polymer can impart excellent impact strength, tensile strength, tensile elongation, flexural strength, and the like to the thermoplastic resin composition while affecting the processability and heat resistance of the thermoplastic resin composition as little as possible.

The diene-based rubber polymer may include a first diene-based rubber graft polymer and a second diene-based rubber graft polymer, whose diene-based rubber polymers have mutually different average particle diameters, to maximize surface smoothness as well as to improve impact strength, tensile strength, tensile elongation, flexural strength, and the like.

The first diene-based rubber graft polymer may be formed by graft polymerization of a diene-based rubber polymer having an average particle diameter of 200 to 400 nm with an aromatic vinyl-based monomer and a vinyl cyanide-based monomer, preferably by graft polymerization of a diene-based rubber polymer having an average particle diameter of 250 to 350 nm with an aromatic vinyl-based monomer and a vinyl cyanide-based monomer, and more preferably by graft polymerization of a diene-based rubber polymer having an average particle diameter of 280 to 320 nm with an aromatic vinyl-based monomer and a vinyl cyanide-based monomer. When the first diene-based rubber graft polymer satisfies the above-described condition, remarkably excellent impact strength can be imparted to the thermoplastic resin composition.

The second diene-based rubber graft polymer may be formed by graft polymerization of a diene-based rubber polymer having an average particle diameter of 50 to 150 nm with an aromatic vinyl-based monomer and a vinyl cyanide-based monomer, preferably by graft polymerization of a diene-based rubber polymer having an average particle diameter of 70 to 130 nm with an aromatic vinyl-based monomer and a vinyl cyanide-based monomer, and more preferably by graft polymerization of a diene-based rubber polymer having an average particle diameter of 90 to 110 nm with an aromatic vinyl-based monomer and a vinyl cyanide-based monomer. When the second diene-based rubber graft polymer satisfies the above-described condition, remarkably excellent tensile strength, tensile elongation, and flexural strength can be imparted to the thermoplastic resin composition, and surface smoothness can be maximized, resulting in excellent aluminum deposition characteristics.

Meanwhile, when the thermoplastic resin composition is used in a field that requires excellent impact strength, the diene-based rubber graft polymer may include an excessive amount of the first diene-based rubber graft polymer. In addition, the thermoplastic resin composition is used in a field that requires excellent tensile strength, tensile elongation, flexural strength, and surface smoothness, the diene-based rubber graft polymer may include an excessive amount of the second diene-based rubber graft polymer. When the thermoplastic resin composition is used for a rear lamp housing of an automobile, the diene-based rubber graft polymer may include the first diene-based rubber graft polymer and the second diene-based rubber graft polymer in a weight ratio of 30:70 to 50:50, preferably 35:65 to 45:55, and more preferably 40:60 to 45:55. When the above-described condition is satisfied, tensile strength, tensile elongation, flexural strength, and surface smoothness are improved while degradation of impact strength is minimized, and thus a thermoplastic resin composition more suitable for a rear lamp housing of an automobile can be prepared.

Meanwhile, the diene-based rubber graft polymer may be a graft polymer formed by graft polymerization of a butadiene rubber polymer with styrene and acrylonitrile.

2) Alkyl-Unsubstituted Styrene-Based Polymer

An alkyl-unsubstituted styrene-based polymer is a copolymer of an alkyl-unsubstituted styrene-based monomer and a vinyl cyanide-based monomer and may be a polymer including an alkyl-unsubstituted styrene-based monomer unit and a vinyl cyanide-based monomer unit. The alkyl-unsubstituted styrene-based polymer may impart excellent processability to the thermoplastic resin composition.

The alkyl-unsubstituted styrene-based polymer may be included at 15 to 40 wt %, and preferably, 20 to 35 wt % in the thermoplastic resin composition. When the above-described condition is satisfied, excellent processability can be imparted to the thermoplastic resin composition.

The alkyl-unsubstituted styrene-based polymer may include the vinyl cyanide-based monomer unit at 21 to 25 wt %, and preferably, 22 to 24 wt %. When the above-described condition is satisfied, degradation of processability can be prevented, and the generation of heat fusion lines can be minimized.

The alkyl-unsubstituted styrene-based polymer may have a weight-average molecular weight of 100,000 to 120,000 g/mol, and preferably, 105,000 to 115,000 g/mol. When the above-described condition is satisfied, the processability of the alkyl-unsubstituted styrene-based polymer can be improved.

Meanwhile, the alkyl-unsubstituted styrene-based polymer may be a styrene/acrylonitrile polymer.

3) Alkyl-Substituted Styrene-Based Polymer

An alkyl-substituted styrene-based polymer is a polymer including an alkyl-substituted styrene-based monomer unit, an alkyl-unsubstituted styrene-based monomer unit, and a vinyl cyanide-based monomer unit and may be a copolymer of an alkyl-substituted styrene-based monomer, an alkyl-unsubstituted styrene-based monomer, and a vinyl cyanide-based monomer.

The alkyl-substituted styrene-based polymer may not only impart excellent heat resistance and aluminum deposition characteristics to the thermoplastic resin composition but also minimize the generation of heat fusion lines.

The alkyl-substituted styrene-based polymer may be included at 25 to 45 wt %, and preferably, 30 to 40 wt % in the thermoplastic resin composition. When the above-described condition is satisfied, excellent heat resistance and aluminum deposition characteristics can be imparted to the thermoplastic resin composition, and the generation of heat fusion lines can be minimized.

The alkyl-substituted styrene-based polymer may have a weight-average molecular weight of 90,000 to 120,000 g/mol, and preferably, 105,000 to 115,000 g/mol. When the above-described condition is satisfied, the heat resistance of the thermoplastic resin composition can be improved, and the generation of heat fusion lines can be minimized.

The alkyl-substituted styrene-based polymer may include: the alkyl-substituted styrene-based monomer unit at 55 to 75 wt %; the alkyl-unsubstituted styrene-based monomer unit at 3 to 15 wt %; and the vinyl cyanide-based monomer unit at 20 to 35 wt % and preferably includes: the alkyl-substituted styrene-based monomer unit at 60 to 70 wt %; the alkyl-unsubstituted styrene-based monomer unit at 5 to 10 wt %; and the vinyl cyanide-based monomer unit at 23 to 30 wt %. When the above-described range is satisfied, the heat resistance, processability, and chemical resistance of the alkyl-substituted styrene-based polymer can be improved.

Meanwhile, the alkyl-substituted styrene-based polymer may be an $\alpha$-methylstyrene/styrene/acrylonitrile polymer.

4) Maleimide-Based Polymer

A maleimide-based polymer is a polymer formed by polymerizing a maleic acid-based monomer and an aromatic vinyl-based monomer and then converting a maleic acid-based monomer unit structure into a maleimide-based monomer unit structure, and the final polymer is a polymer including a maleimide-based monomer unit and an aromatic vinyl-based monomer unit and may be a polymer further including a maleic acid-based monomer unit in addition thereto. The maleimide-based polymer may impart excellent heat resistance to the thermoplastic resin composition.

The maleimide-based polymer may have a weight-average molecular weight of 110,000 to 127,000 g/mol, and preferably, 115,000 to 125,000 g/mol. When the above-described range is satisfied, the processability and diffuse reflectance of the thermoplastic resin composition can be improved. Below the above-described range, mechanical properties may be degraded, and the generation of heat fusion lines may increase. Above the above-described range, processability and diffuse reflectance may be degraded, and the generation of heat fusion lines may increase.

The maleimide-based polymer may have a glass transition temperature of 180 to 190° C., and preferably, 182 to 188° C. When the above-described condition is satisfied, the processability, heat resistance, and diffuse reflectance of the thermoplastic resin composition can be improved, and the generation of heat fusion lines can be minimized, making it more suitable for a rear lamp housing of an automobile.

The maleimide-based polymer may be included at 5 to 15 wt %, and preferably, 7 to 12 wt % in the thermoplastic resin composition. When the above-described condition is satisfied, the heat resistance of the thermoplastic resin composition can be improved.

Meanwhile, the maleimide-based polymer may be one or more selected from the group consisting of an N-phenyl maleimide/styrene polymer and an N-phenyl maleimide/styrene/maleic anhydride polymer.

Meanwhile, the thermoplastic resin composition according to the embodiment of the present invention may further include an additive to supplement processability. The additive may be a copolymer including an aromatic vinyl-based monomer unit and a vinyl cyanide-based monomer unit and having a weight-average molecular weight of 10,000 to 80,000 g/mol.

Hereinafter, the present invention will be described in detail with reference to embodiments so that those skilled in the art can easily carry out the present invention. However, the present invention may be embodied in several different forms, and therefore, is not limited to embodiments described herein.

EXAMPLES AND COMPARATIVE EXAMPLES

Descriptions about components used in the examples and comparative examples below are as follows.

1-1) First diene-based rubber polymer: DP270E commercially available from LG Chem Ltd (graft polymer formed by graft polymerization of a butadiene rubber polymer having an average particle diameter of 300 nm with styrene and acrylonitrile)

1-2) Second diene-based rubber polymer: DP229M commercially available from LG Chem Ltd (graft polymer formed by graft polymerization of a butadiene rubber polymer having an average particle diameter of 100 nm with styrene and acrylonitrile)

2-1) Alkyl-unsubstituted styrene-based polymer: 83SF commercially available from LG Chem Ltd (styrene/acrylonitrile polymer including an acrylonitrile-based unit at 23 wt % and a styrene-based unit at 77 wt %, weight-average molecular weight: 110,000 g/mol)

2-2) Alkyl-unsubstituted styrene-based polymer: 95RF commercially available from LG Chem Ltd (styrene/acrylonitrile polymer including an acrylonitrile-based unit at 30 wt % and a styrene-based unit at 70 wt %, weight-average molecular weight: 95,000 g/mol)

2-3) Alkyl-unsubstituted styrene-based polymer: 81HF commercially available from LG Chem Ltd (styrene/acrylonitrile polymer including an acrylonitrile-based unit at 24 wt % and a styrene-based unit at 76 wt %, weight-average molecular weight: 130,000 g/mol)

3-1) Alkyl-substituted styrene-based polymer: 99UH commercially available from LG Chem Ltd (α-methylstyrene/styrene/acrylonitrile polymer including an α-methylstyrene unit at 65 wt %, a styrene unit at 7 wt %, and an acrylonitrile unit at 28 wt %, weight-average molecular weight: 105,000 g/mol)

4-1) Maleimide-based polymer: MS-NJ commercially available from Denka Company Limited (N-phenyl maleimide/styrene polymer, weight-average molecular weight: 120,000 g/mol, glass transition temperature: 185° C.)

5-1) Additive: EMI-200 commercially available from SUNNY FC (styrene/acrylonitrile copolymer)

6-1) Alkyl-substituted styrene-based polymer: 200UH commercially available from LG Chem Ltd (α-methylstyrene/acrylonitrile polymer including an α-methylstyrene unit at 72 wt % and an acrylonitrile unit at 28 wt %, weight-average molecular weight: 95,000 g/mol)

7-1) Maleimide-based polymer: MS-NB commercially available from Denka Company Limited (N-phenyl maleimide/styrene polymer, weight-average molecular weight: 140,000 g/mol, glass transition temperature: 196° C.)

7-2) Maleimide-based polymer: MS-NI commercially available from Denka Company Limited (N-phenyl maleimide/styrene polymer, weight-average molecular weight: 130,000 g/mol, glass transition temperature: 185° C.)

7-3) Maleimide-based polymer: IZO926M commercially available from POLYSCOPE (N-phenyl maleimide/styrene polymer, weight-average molecular weight: 100,000 g/mol, glass transition temperature: 175° C.)

The above-described components were mixed in contents shown in Tables 1 and 2 and stirred to prepare thermoplastic resin compositions.

Experimental Examples 1

The thermoplastic resin compositions of the examples and comparative examples were extruded to prepare pellets, the pellets were evaluated by a method described below, and results thereof are shown in Tables 1 and 2 below.

(1) Melt flow index (g/10 min): measured in accordance with ASTM D1238 under 220° C. and 10 kg conditions.

Experimental Examples 2

The thermoplastic resin compositions of the examples and comparative examples were extruded and injection-molded to prepare specimens, the specimens were evaluated by methods described below, and results thereof are shown in Tables 1 and 2 below.

(2) Heat deflection temperature (HDT, ° C.): measured in accordance with ASTM D648 under an unannealed condition.

(3) Vicat softening temperature (VST, ° C.): measured in accordance with ASTM D1525 under an unannealed condition.

(4) IZOD impact strength (kg·cm/cm, ¼ inch): measured in accordance with ASTM D256.

(5) Tensile strength (kg/cm$^2$) and tensile elongation (%): measured in accordance with ASTM D638.

(6) Flexural strength (kg/cm$^2$): measured in accordance with ASTM D790.

Experimental Examples 3

The thermoplastic resin compositions of the examples and comparative examples were extruded and injection-molded to prepare specimens with a size of 10 cm×10 cm, and aluminum (Al) was vacuum-deposited on the surface of the specimens using a vacuum deposition device (high-vacuum deposition device commercially available from Daehan Vacuum Eng, Co.). A property of the specimens including an Al film formed thereon was measured by a method described below, and results thereof are shown in Tables 1 and 2.

(7) Total reflectance and diffuse reflectance (%): Diffuse reflectance and specular reflectance were measured using a surface glossiness measurement instrument (reflectometer (TR-1100AD) commercially available from Tokyo Denshoku Co., Ltd.). Total reflectance is the sum of diffuse reflectance and specular reflectance. In this case, since diffuse reflectance is greatly affected by sensitivity according to gas and surface characteristics, the state of the vacuum-deposited surface could be inferred from the diffuse reflectance.

Experimental Examples 4

The thermoplastic resin compositions of the examples and comparative examples were extruded and injection-molded to prepare specimens with a size of 10 cm×10 cm. The specimens were allowed to contact a heat plate, whose surface temperature was 240° C., for 10 seconds using heat fusion equipment and then to be detached at high or low speeds. Then, the length and number of generated lines were measured, and results thereof are shown in the following Tables 1 and 2.

TABLE 1

| Classification | Example 1 | Example 2 | Example 3 | Comparative Example 1 | Comparative Example 2 | Comparative Example 3 |
|---|---|---|---|---|---|---|
| 1-1) First diene-based rubber graft polymer (wt %) | 11 | 11 | 11 | 11 | 11 | 11 |
| 1-2) Second diene-based rubber graft polymer (wt %) | 15 | 15 | 15 | 15 | 15 | 15 |

TABLE 1-continued

| Classification | | Example 1 | Example 2 | Example 3 | Comparative Example 1 | Comparative Example 2 | Comparative Example 3 |
|---|---|---|---|---|---|---|---|
| 2-1) Alkyl-unsubstituted styrene-based polymer (wt %) | | 21 | 26 | 31 | 31 | — | — |
| 2-2) Alkyl-unsubstituted styrene-based polymer (wt %) | | — | — | — | — | 31 | 43 |
| 2-3) Alkyl-unsubstituted styrene-based polymer (wt %) | | — | — | — | — | — | 11 |
| 3-1) Alkyl-substituted styrene-based polymer (wt %) | | 40 | 35 | 30 | — | — | — |
| 4-1) Maleimide-based polymer (wt %) | | 10 | 10 | 10 | 10 | 10 | 17 |
| 5-1) Additive (wt %) | | 3 | 3 | 3 | 3 | 3 | 3 |
| 6-1) Alkyl-substituted styrene-based polymer | | — | — | — | 30 | 30 | — |
| Melt flow index | | 12.0 | 13.7 | 15.7 | 16.1 | 12.3 | 18.4 |
| Heat deflection temperature | | 100.1 | 100 | 100 | 100.4 | 102.2 | 100.6 |
| Vicat softening temperature | | 110.6 | 110.4 | 110.3 | 110.4 | 112.8 | 110.9 |
| IZOD impact strength | | 12.6 | 12.9 | 13.3 | 12.2 | 14.1 | 12.4 |
| Tensile strength | | 512.1 | 514.8 | 516.8 | 517.9 | 520.5 | 514.8 |
| Tensile elongation | | 41.9 | 33.6 | 29.9 | 41.3 | 41.1 | 37.8 |
| Flexural strength | | 729.6 | 725.7 | 718.8 | 723.8 | 736.5 | 712.7 |
| Total reflectance | | 92.0 | 91.9 | 91.9 | 91.8 | 91.5 | 91.0 |
| Diffuse reflectance | | 5.3 | 5.0 | 4.9 | 4.8 | 4.8 | 6.1 |
| Heat fusion line evaluation (low speed) | Length of line | 1.6 | 1.5 | 1.5 | 1.5 | 3.3 | 2.8 |
| | Number of lines | 16 | 16 | 13 | 43 | 72 | 50 |
| Heat fusion line evaluation (high speed) | Length of line | 1 | 0 | 0 | 7 | 0 | 7 |
| | Number of lines | 0 | 0 | 0 | 2 | 0 | 30 |

1-1) First diene-based rubber polymer: DP270E commercially available from LG Chem Ltd (graft polymer formed by graft polymerization of a butadiene rubber polymer having an average particle diameter of 300 nm with styrene and acrylonitrile)
1-2) Second diene-based rubber polymer: DP229M commercially available from LG Chem Ltd (graft polymer formed by graft polymerization of a butadiene rubber polymer having an average particle diameter of 100 nm with styrene and acrylonitrile)
2-1) Alkyl-unsubstituted styrene-based polymer: 83SF commercially available from LG Chem Ltd (styrene/acrylonitrile polymer including an acrylonitrile-based unit at 23 wt % and a styrene-based unit at 77 wt %, weight-average molecular weight: 110,000 g/mol)
2-2) Alkyl-unsubstituted styrene-based polymer: 95RF commercially available from LG Chem Ltd (styrene/acrylonitrile polymer including an acrylonitrile-based unit at 30 wt % and a styrene-based unit at 70 wt %, weight-average molecular weight: 95,000 g/mol)
2-3) Alkyl-unsubstituted styrene-based polymer: 81HF commercially available from LG Chem Ltd (styrene/acrylonitrile polymer including an acrylonitrile-based unit at 24 wt % and a styrene-based unit at 76 wt %, weight-average molecular weight: 130,000 g/mol)
3-1) Alkyl-substituted styrene-based polymer: 99UH commercially available from LG Chem Ltd (α-methylstyrene/styrene/acrylonitrile polymer including an α-methylstyrene unit at 65 wt %, a styrene unit at 7 wt %, and an acrylonitrile unit at 28 wt %, weight-average molecular weight: 105,000 g/mol)
4-1) Maleimide-based polymer: MS-NJ commercially available from Denka Company Limited (N-phenyl maleimide/styrene polymer, weight-average molecular weight: 120,000 g/mol, glass transition temperature: 185° C.)
5-1) Additive: EMI-200 commercially available from SUNNY FC (styrene/acrylonitrile copolymer)
6-1) Alkyl-substituted styrene-based polymer: 200UH commercially available from LG Chem Ltd (α-methylstyrene/acrylonitrile polymer including an α-methylstyrene unit at 72 wt % and an acrylonitrile unit at 28 wt %, weight-average molecular weight: 95,000 g/mol)

TABLE 2

| Classification | Comparative Example 4 | Comparative Example 5 | Comparative Example 6 |
|---|---|---|---|
| 1-1) First diene-based rubber graft polymer (wt %) | 11 | 11 | 11 |
| 1-2) Second diene-based rubber graft polymer (wt %) | 15 | 15 | 15 |
| 2-1) Alkyl-unsubstituted styrene-based polymer (wt %) | 31 | 31 | 31 |
| 2-2) Alkyl-unsubstituted styrene-based polymer (wt %) | — | — | — |
| 2-3) Alkyl-unsubstituted styrene-based polymer (wt %) | — | — | — |
| 3-1) Alkyl-substituted styrene-based polymer (wt %) | 30 | 30 | 30 |
| 4-1) Maleimide-based polymer (wt %) | — | — | — |
| 5-1) Additive (wt %) | 3 | 3 | 3 |
| 7-1) Maleimide-based polymer | 10 | — | — |
| 7-2) Maleimide-based polymer | — | 10 | — |
| 7-3) Maleimide-based polymer | — | — | 10 |
| Melt flow index | 13.2 | 14.4 | 14.8 |
| Heat deflection temperature | 100.2 | 99.6 | 99.2 |
| Vicat softening temperature | 108.0 | 107.8 | 107.1 |
| IZOD impact strength | 13.9 | 13.9 | 15.7 |
| Tensile strength | 507.8 | 491.5 | 467.1 |
| Tensile elongation | 34.9 | 39.5 | 35.3 |
| Flexural strength | 707.6 | 685.6 | 649.8 |
| Total reflectance | 90.5 | 91.1 | 89.9 |

TABLE 2-continued

| Classification | | Comparative Example 4 | Comparative Example 5 | Comparative Example 6 |
|---|---|---|---|---|
| Diffuse reflectance | | 6.1 | 5.8 | 7.1 |
| Heat fusion line evaluation (low speed) | Length of line | 1.8 | 2 | 2 |
| | Number of lines | 14 | 26 | 31 |
| Heat fusion line evaluation (high speed) | Length of line | 4 | 3 | 2.7 |
| | Number of lines | 25 | 15 | 30 |

1-1) First diene-based rubber polymer: DP270E commercially available from LG Chem Ltd (graft polymer formed by graft polymerization of a butadiene rubber polymer having an average particle diameter of 300 nm with styrene and acrylonitrile)
1-2) Second diene-based rubber polymer: DP229M commercially available from LG Chem Ltd (graft polymer formed by graft polymerization of a butadiene rubber polymer having an average particle diameter of 100 nm with styrene and acrylonitrile)
2-1) Alkyl-unsubstituted styrene-based polymer: 83SF commercially available from LG Chem Ltd (styrene/acrylonitrile polymer including an acrylonitrile-based unit at 23 wt % and a styrene-based unit at 77 wt %, weight-average molecular weight: 110,000 g/mol)
2-2) Alkyl-unsubstituted styrene-based polymer: 95RF commercially available from LG Chem Ltd (styrene/acrylonitrile polymer including an acrylonitrile-based unit at 30 wt % and a styrene-based unit at 70 wt %, weight-average molecular weight: 95,000 g/mol)
2-3) Alkyl-unsubstituted styrene-based polymer: 81HF commercially available from LG Chem Ltd (styrene/acrylonitrile polymer including an acrylonitrile-based unit at 24 wt % and a styrene-based unit at 76 wt %, weight-average molecular weight: 130,000 g/mol)
3-1) Alkyl-substituted styrene-based polymer: 99UH commercially available from LG Chem Ltd (a-methylstyrene/styrene/acrylonitrile polymer including an α-methylstyrene unit at 65 wt %, a styrene unit at 7 wt %, and an acrylonitrile unit at 28 wt %, weight-average molecular weight: 105,000 g/mol)
4-1) Maleimide-based polymer: MS-NJ commercially available from Denka Company Limited (N-phenyl maleimide/styrene polymer, weight-average molecular weight: 120,000 g/mol, glass transition temperature: 185° C.)
5-1) Additive: EMI-200 commercially available from SUNNY FC (styrene/acrylonitrile copolymer)
7-1) Maleimide-based polymer: MS-NB commercially available from Denka Company Limited (N-phenyl maleimide/styrene polymer, weight-average molecular weight: 140,000 g/mol, glass transition temperature: 196° C.)
7-2) Maleimide-based polymer: MS-NI commercially available from Denka Company Limited (N-phenyl maleimide/styrene polymer, weight-average molecular weight: 130,000 g/mol, glass transition temperature: 185° C.)
7-3) Maleimide-based polymer: IZO926M commercially available from POLYSCOPE (N-phenyl maleimide/styrene polymer, weight-average molecular weight: 100,000 g/mol, glass transition temperature: 175° C.)

Referring to Table 1, in the case of Examples 1 to 3, it can be seen that as the content of an alkyl-substituted styrene-based polymer was small, improved tensile strength, lower diffuse reflectance, and excellent evaluation results for heat fusion lines were exhibited. When Example 3 was compared with Comparative Examples 1 and 2, it can be seen that Example 3 exhibited a remarkably excellent evaluation result for heat fusion lines compared to Comparative Example 2 including an α-methylstyrene/acrylonitrile polymer instead of an α-methylstyrene/styrene/acrylonitrile polymer. In addition, it can be seen that Example 3 exhibited a remarkably excellent evaluation result for heat fusion lines compared to Comparative Example 2 including an α-methylstyrene/acrylonitrile polymer instead of an α-methylstyrene/styrene/acrylonitrile polymer and a styrene/acrylonitrile polymer containing an excessive amount of an acrylonitrile unit.

In addition, it can be seen that Comparative Example 3 not including an α-methylstyrene/styrene/acrylonitrile polymer exhibited high diffuse reflectance and a poor evaluation result for heat fusion lines compared to Examples 1 to 3.

Additionally, when Example 3 was compared with Comparative Examples 4 to 6, it can be seen that the thermoplastic resin composition of Comparative Example 4 including an N-phenyl maleimide/styrene polymer having a weight-average molecular weight of 140,000 g/mol and a glass transition temperature of 196° C. exhibited degraded evaluation results for diffuse reflectance and heat fusion lines compared to the thermoplastic resin composition of Example 3. Also, it can be seen that the thermoplastic resin composition of Comparative Example 5 including an N-phenyl maleimide/styrene polymer having a weight-average molecular weight of 130,000 g/mol and a glass transition temperature of 185° C. exhibited degraded evaluation results for diffuse reflectance and heat fusion lines compared to the thermoplastic resin composition of Example 3. Also, it can be seen that the thermoplastic resin composition of Comparative Example 6 including an N-phenyl maleimide/styrene polymer having a weight-average molecular weight of 100,000 g/mol and a glass transition temperature of 175° C. exhibited degraded evaluation results for diffuse reflectance and heat fusion lines compared to the thermoplastic resin composition of Example 3. From these results, it can be seen that not only the weight-average molecular weight but also the glass transition temperature of a maleimide-based polymer affects evaluation results for the diffuse reflectance and heat fusion lines of the thermoplastic resin composition.

The invention claimed is:
1. A thermoplastic resin composition comprising:
a diene-based rubber graft polymer;
an alkyl-unsubstituted styrene-based polymer;
an alkyl-substituted styrene-based polymer comprising an alkyl-substituted styrene-based monomer unit, an alkyl-unsubstituted styrene-based monomer unit, and a vinyl cyanide-based monomer unit; and
a maleimide-based polymer having a weight-average molecular weight of 110,000 to 127,000 g/mol,
wherein the maleimide-based polymer has a glass transition temperature of 180 to 190° C.,
wherein the diene-based rubber graft polymer comprises a first diene-based rubber graft polymer formed by graft polymerization of a diene-based rubber polymer having an average particle diameter of 200 to 400 nm with an aromatic vinyl-based monomer and a vinyl cyanide-based monomer, and a second diene-based rubber graft polymer formed by graft polymerization of a diene-based rubber polymer having an average particle diameter of 50 to 150 nm with an aromatic vinyl-based monomer and a vinyl cyanide-based monomer, and
wherein the diene-based rubber graft polymer comprises the first diene-based rubber graft polymer and the second diene-based rubber graft polymer in a weight ratio of 30:70 to 45:55.

2. The thermoplastic resin composition of claim 1, wherein the alkyl-substituted styrene-based polymer has a weight-average molecular weight of 90,000 to 120,000 g/mol.

3. The thermoplastic resin composition of claim 1, wherein the alkyl-substituted styrene-based polymer comprises:
   the alkyl-substituted styrene-based monomer unit at 55 to 75 wt %;
   the alkyl-unsubstituted styrene-based monomer unit at 3 to 15 wt %; and
   the vinyl cyanide-based monomer unit at 20 to 35 wt %.

4. The thermoplastic resin composition of claim 1, wherein the alkyl-substituted styrene-based polymer is an α-methylstyrene/styrene/acrylonitrile polymer.

5. The thermoplastic resin composition of claim 1, wherein the maleimide-based polymer comprises a maleimide-based monomer unit and an aromatic vinyl-based monomer unit.

6. The thermoplastic resin composition of claim 5, wherein the maleimide-based polymer further comprises a maleic acid-based monomer unit.

7. The thermoplastic resin composition of claim 1, wherein the thermoplastic resin composition comprises:
   the diene-based rubber graft polymer at 20 to 35 wt %;
   the alkyl-unsubstituted styrene-based polymer at 15 to 40 wt %;
   the alkyl-substituted styrene-based polymer at 25 to 45 wt %; and
   the maleimide-based polymer at 5 to 15 wt %.

8. The thermoplastic resin composition of claim 1, wherein the alkyl-unsubstituted styrene-based polymer comprises an alkyl-unsubstituted styrene-based monomer unit and a vinyl cyanide-based monomer unit.

* * * * *